US009294148B1

(12) United States Patent
van Casteren et al.

(10) Patent No.: US 9,294,148 B1
(45) Date of Patent: Mar. 22, 2016

(54) POWER LINE COMMUNICATION SYSTEM

(71) Applicant: LED Driven Holding B.V., Breda (NL)

(72) Inventors: Dolf van Casteren, Eindhoven (NL); Mark Gröninger, Venlo (NL); Menno Kardolus, Duivendrecht (NL)

(73) Assignee: LED DRIVEN HOLDING B.V., Breda (NI)

( * ) Notice: Subject to any disclaimer, the term of this patent is extended or adjusted under 35 U.S.C. 154(b) by 0 days.

(21) Appl. No.: 14/845,858

(22) Filed: Sep. 4, 2015

(30) Foreign Application Priority Data

Sep. 8, 2014 (EP) .................................... 14183993

(51) Int. Cl.
*H04B 3/54* (2006.01)
*H04B 1/04* (2006.01)
*H04B 1/16* (2006.01)

(52) U.S. Cl.
CPC .................. *H04B 3/542* (2013.01); *H04B 1/04* (2013.01); *H04B 1/16* (2013.01)

(58) Field of Classification Search
CPC ............. H04B 3/542; H04B 1/04; H04B 1/16
See application file for complete search history.

(56) References Cited

U.S. PATENT DOCUMENTS 6,940,187 B2 * 9/2005 Escobar .................... H02J 3/01 307/105
2004/0174271 A1 * 9/2004 Welles, II ................. H04Q 9/00 340/870.02
2007/0286305 A1 * 12/2007 Saggini .................. H04B 3/548 375/272
2008/0013637 A1 * 1/2008 Kodama ................... H04B 3/54 375/260

OTHER PUBLICATIONS

Stefanutti, W et al. Power Line Communication in Digitally Controlled DC-DC Converters Using Switching Frequency Modulation. IEEE Transactions on Industrial Electronics, IEEE Service Center, Piscataway, NJ, vol. 55, No. 4, Apr. 1, 2008, pp. 1509-1518.
Saijun Zhang et al. A Unified Analytical Modeling of the Interleaved Pulse Width Modulation (PWM) DC-DC Converter and its Applications. IEEE Transactions on Power Electronics, Institute of Electrical and Electronics Engineers, USA, vol. 28, No. 11, Nov. 1, 2013, pp. 5147-5158.
Cheung, T.K. et al. Application of ASK Modulation for DC/DC Converters Control in DC Distribution Power System. Power Electronics Systems and Applications, 2004. Proceedings. 2004 First International Conference on Hong Kong Nov. 9-11, 2004, Piscataway, NJ, Nov. 9, 2004, pp. 268-272.

* cited by examiner

*Primary Examiner* — Dac Ha
(74) *Attorney, Agent, or Firm* — Richard M. Goldberg

(57) ABSTRACT

A power supply circuit includes a number N, N≥2, of parallel connected, cyclically switched electronic converters having outputs connected to a common output terminal; and a controller providing switching pulse signals switching the converters with a switching frequency that is the same for all converters; load circuits connected to the output terminal; a PLC transmitter modulating an output current from the output terminal; and a PLC receiver in each load circuit, the controller switching the converters with interleaved switching pulse signals; the PLC transmitter modulating the output current by switching the controller between at least two modes of operation that differ in phase relations and/or pulse shapes of the switching pulse signals, changing a ripple frequency spectrum of the output current such that a suppression amount of a predetermined frequency component is changed depending upon the mode of operation; and the PLC receiver detects the predetermined frequency component.

5 Claims, 7 Drawing Sheets

POWER LINE COMMUNICATION SYSTEM

BACKGROUND OF THE INVENTION

The invention relates to a power line communication (PLC) system comprising

- a power supply circuit comprising
  - a number N, N≥2, of cyclically switched electronic converters connected in parallel and having respective outputs connected to a common output terminal of the power supply circuit; and
  - a controller providing switching pulse signals for switching the converters with a switching frequency that is the same for all converters;
- at least one load circuit connected to the output terminal of the power supply circuit;
- a PLC transmitter arranged to modulate an output current from the output terminal of the power supply circuit; and
- a PLC receiver in said at least one load circuit.

In a power line communication (PLC) system, a power line that connects an electric power source to a consumer is used for transmitting signals in addition to the electric power, for example for the purpose of remote control of the consumer. Power line communication eliminates the need to install specific communication wirelines and nevertheless avoids the costs for wireless communication equipment.

Typically, the transmitter modulates the voltage or current on the power line with a switching frequency f0 that is significantly higher than the grid frequency of 50 or 60 Hz, so that the communication signals can readily be separated from the grid frequency in case of an AC power supply.

In addition to broadcasting messages to all receivers that are connected to the power supply circuit, it is also possible to address individual receivers. In order to limit the bandwidth requirements and to be able to use identical receivers in the different load circuits, a communication protocol may be used in which each message is accompanied by an address sequence that identifies the individual receiver for which the message was intended. In this case, a commissioning procedure is performed in order to assign a specific address to each receiver.

A general problem in conjunction with power line communication is to control the range of the communication signals such that, on the one hand, all connected receivers can safely receive the messages with a sufficient signal to noise ratio and, on the other hand, the signals are not spread so far over the power grid that privacy of the communication is compromised.

SUMMARY OF THE INVENTION

The communication may be unidirectional, with messages being sent only from the transmitter to the receiver, or bidirectional. In the latter case, the receiver must also be capable of modulating the voltage or current, and the transmitter must be capable of demodulating the signal. The present invention is specifically concerned with the communication from the transmitter on the side of the power supply circuit to the receiver or receivers on the side of the load circuits. For this communication direction, it is convenient to integrate the transmitter in the power supply circuit.

The present invention is intended for use with a specific type of power supply circuits that include a plurality of electronic converters connected in parallel. Power supply circuits of this type have the advantage that, although the total power of the power supply circuit may be considerable, the individual converters may be designed for a relatively low power, which reduces the costs for electronic equipment.

It is an object of the invention to provide a power line communication system that is specifically adapted to this type of power supply circuit.

According to the invention,

- the controller is arranged to switch the converters with interleaved switching pulse signals;
- the PLC transmitter is arranged to modulate the output current by switching the controller between at least two modes of operation that differ from one another in phase relations and/or pulse shapes of the switching pulse signals, thereby changing a ripple frequency spectrum of the output current in such a way that a suppression amount of a predetermined frequency component in the ripple spectrum is changed depending upon the mode of operation; and
- the PLC receiver is arranged to detect said predetermined frequency component.

The fact that the converters are switched with interleaved switching pulse signals offers an elegant possibility to modulate the output current and has the further advantage that the current consumption of the power supply circuit is smoothed, which facilitates power factor correction and noise reduction. The term “interleaved switching pulse signals” means that the switching pulses for the different resonant tanks do not occur at equal timings but with a time offset, so that a pulse for one resonant tank intervenes between two successive pulses for another resonant tank.

The switching operations in the different converters cause a certain ripple in the output current at the point where the outputs of all the converters are connected together. The interleaved switching helps to generally reduce the amplitude of the ripple and has the further consequence that the frequency spectrum of the ripple is generally shifted to higher frequencies. Moreover, the exact shape of the frequency spectrum depends upon the specific relations between the switching pulse signals for the different converters.

For example, when the controller operates in a balanced mode in which all switching pulse signals have equal phase offsets relative to one another and all have the same pulse width, then the ground frequency (lowest frequency) of the ripple will not be the common switching frequency f0 but rather the Nth harmonic thereof, with N being the number of converters. However, when at least one of the switching pulse signals is phase shifted relative to the other switching pulse signals and/or the pulse width of one of the switching pulse signals is different from that of the other switching pulse signals, this will result in the occurrence of frequency components with other frequencies, in particular, a frequency component with a frequency as low as the switching frequency f0. Further, higher harmonics of this switching frequency will be present which are different from any of the balanced ground frequency N·f0 and its harmonics. These extra frequency components can accordingly be suppressed by switching the controller from an unbalanced mode of operation to a more balanced mode. Since the PLC receiver is arranged to detect this frequency component or components, the information as to whether or not the detected frequency component is present can be utilized as the power line communication signal.

It is an advantage of the invention that no specific modulator is needed for power line communication, but instead the modulation is based on the high frequency switching capability of the controller that is needed anyway for driving the converters. As the converters are typically switched with a high frequency, e.g. in the order of magnitude of 25 to 100 kHz, one automatically obtains a PLC modulation frequency in the same order of magnitude, with the additional benefit that the noise background is reduced thanks to the interleaved operation of the converters.

The system according to the invention can easily be scaled concurrently with scaling of the power supply circuit. When the number of consumers (load circuits) is increased, the higher demand for power can be satisfied by adding more converters and, when necessary, the signal to noise ratio for power line communication can be increased simply by increasing the number of converters that are driven by phase-shifted switching pulse signals or switching pulse signals with a modified pulse width.

More specific optional features of the invention are indicated in the dependent claims.

As the "predetermined frequency component" to be detected by the receivers is fixed and is the same for all receivers, it is convenient to use self-tuning receivers that are capable of automatically tuning to the frequency component to be detected, as is known per-se in the art.

In a preferred embodiment, the power supply circuit is a multi-stage converter having, for example, a first stage constituted by a single AC/DC converter for converting the grid voltage into a (preferably high) DC voltage, and a second stage formed by the parallel connection of N converters, which are DC/DC converters in this case and convert the high DC voltage of the first stage into a lower DC voltage for a plurality of load circuits or consumers. In this case, power factor correction may mainly be performed in the first stage, and the interleaved switching of the converters of the second stage is facilitated by the fact that the voltage to be switched is already a DC voltage.

Preferably, a normal mode of operation of the controller, when no communication signals are transmitted over the power line, is the balanced mode, in which, preferably, the pulse width of the switching control signals is optimized in terms of switching losses (e.g. continuous mode or critical conduction mode operation). Then, when a bit of a communication signal is to be transmitted, the controller is switched to an unbalanced mode, preferably by phase-shifting the switching pulse signal for at least one converter, for a relatively short time interval that, however, is still significantly larger than the switching period of the converters.

BRIEF DESCRIPTION OF THE DRAWINGS

Embodiment examples will now be described in conjunction with the drawings, wherein.

DETAILED DESCRIPTION

Figure 1:
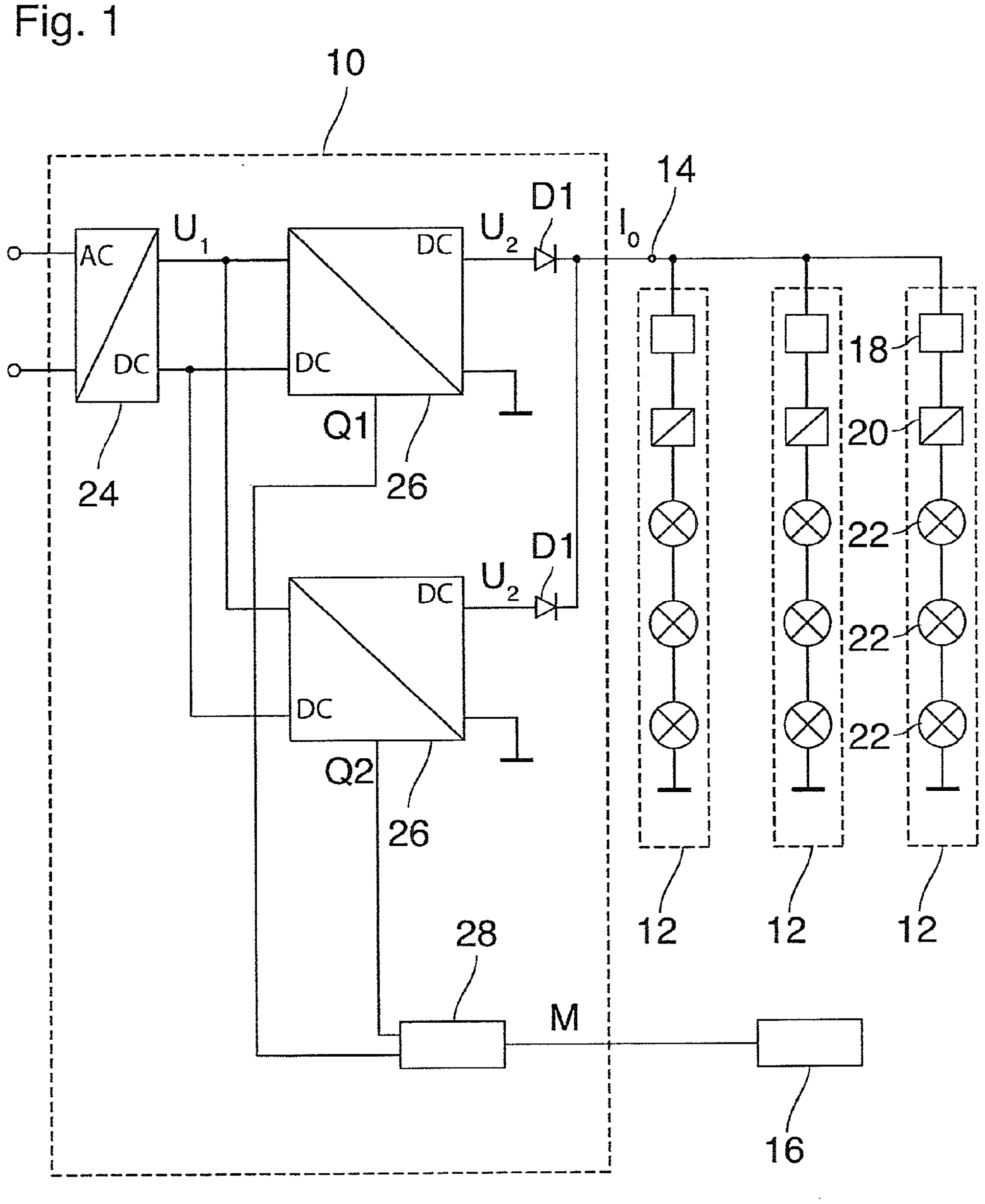
FIG. 1 is a block diagram of a PLC system according to the invention.

In the example shown in FIG. 1 the power line communication system forms part of a lighting system that includes a power supply circuit 10 and a number of parallel load circuits 12, three in this example, that are connected to an output terminal 14 of the power supply circuit 10. A PLC transmitter 16 is connected to the power supply circuit 10, and each load circuit 12 includes a PLC receiver 18 controlling a DC/DC converter 20, and a string of LEDs 22. The DC/DC converter 20 permits to switch on and off and to dim the string of LEDs 22 in accordance with signals received by the PLC receiver 18.

The PLC transmitter 16 is capable of sending digital messages to the PLC receivers 18 by modulating a current $I_0$ that is supplied to the load circuits 12 via the output terminal 14. In a commissioning step, a digital address has been assigned to each of the receivers 18. Each digital message sent to the receivers 18 has the form of a bit sequence that includes an address part and a command part. The address part identifies the receiver 18 that shall execute the command, and the command part instructs the receiver to switch the LEDs 22 on or off or to change the pulse width of a pulsed output current of the DC/DC converter 20, so that the LEDs in the connected string are dimmed more or less.

The power supply circuit 10 includes, as a first stage, an AC/DC converter 24 arranged to convert an AC grid voltage $U_g$ of 230V, for example, into a DC voltage $U_1$ of, for example, 450 V.

A second stage of the power supply circuit 10 is formed by a plurality (two in this example) of DC/DC converters 26 arranged to convert the voltage $U_1$ into a lower output voltage $U_2$ of, for example, 24 V. The converters 26 are connected in parallel to one another, and their outputs are connected to the output terminal 14 via a respective diode D1, so that a large output current $I_0$ can be provided while reverse currents are blocked by the diodes.

As will be described in detail below, each converter 26 is switched with a high frequency. The power supply circuit 10 further includes a controller 28 that provides respective switching pulse signals Q1, Q2 for each of the converters 26. The controller 28 further receives a modulation signal M from the PLC transmitter 16.

Figure 2:
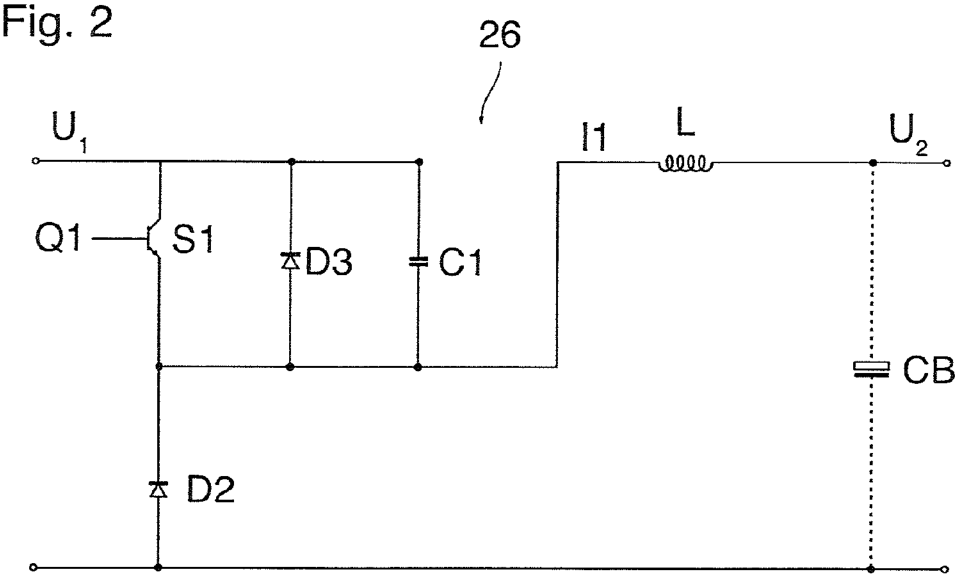
FIG. 2 is a circuit diagram of a simple example of an electronic converter.

FIG. 2 shows a possible implementation of one of the DC/DC converters 26, which is a quasi resonant buck converter in this example. A quasi resonant tank is constituted by the inductance of a coil L and the capacitance of a capacitor C1. The coil L is connected into the voltage $U_1$ via a switch S1 that is controlled by the switching control signal Q1 and is switched on and off with a switching frequency f0. The capacitor C1 is connected in parallel with the switch S1, and diodes D2 and D3 for blocking reverse currents are connected in series and in parallel, respectively, with the switch S1.

Optionally, a buffer capacitor CB may be provided for smoothening the output voltage $U_2$. However, the switching frequency f0 of the switch S1 is so high, e.g. in the order of magnitude of 25 to 150 kHz, that a resulting flicker of the LEDs 22 is not visible for the human eye, so that the buffer capacitor may be dispensed with.

Other implementations of the converters 26 are possible. For example, the converters could have a boost or flyback converter topology. The converters could also be of a fully resonant type.

Figure 3:
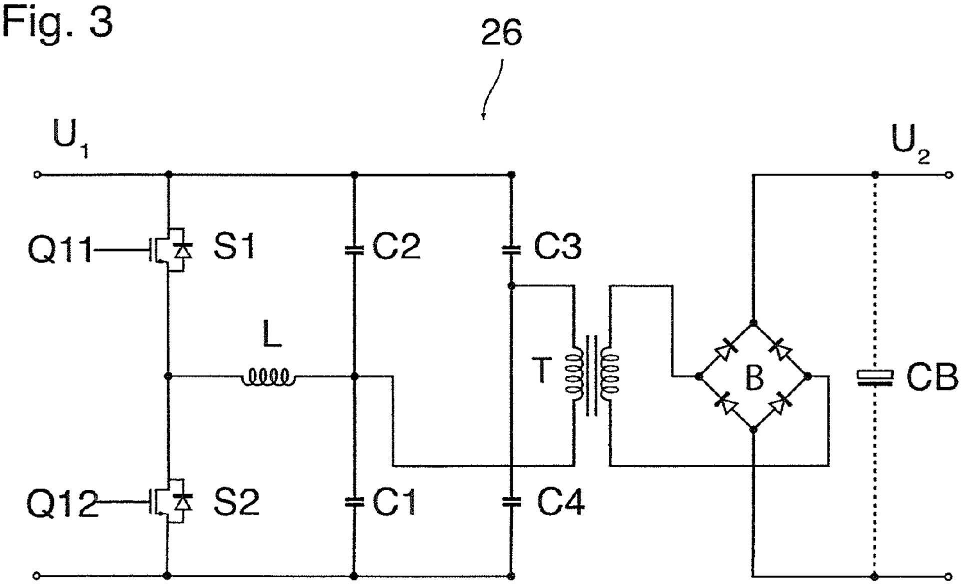
FIG. 3 is a circuit diagram of another example of an electronic converter.

FIG. 3 illustrates another example of the converter 26 (in this case of the fully resonant type). This converter has capacitors C1 and C2 and switches S1 and S2. The capacitors C1 and C2 are connected in series between $U_1$ and ground and constitute the capacitance of a resonant tank. The switches S1 and S2 are also connected in series between $U_1$ and ground. Consequently, in order to avoid a short circuit, the switches S1 and S2, which are controlled by respective switching pulse signals Q11 and Q12, must not be closed simultaneously. The coil L is connected between the midpoint of the switches S1 and S2 and the midpoint of the capacitors C1 and C2. Another pair of capacitors C3 and C4 is connected in series between $U_1$ and ground, and their midpoint defines a mid-voltage to which one terminal of the primary winding of the transformer T is connected while the other terminal is connected to the midpoint of the capacitors C1 and C2. A transformer T is provided for transforming the oscillating voltage of the resonant tank, and the output voltage $U_2$ is formed by rectifying the secondary voltage of the transformer T with a diode bridge B.

When the switches S1 and S2 are switched on and off alternatingly, the voltage at the midpoint between the capacitors C1 and C2 oscillates about the mid-voltage, and an oscillating current flows through the primary winding of the transformer T.

Considering first the case that the DC/DC converters 26 of the power supply circuit 10 are implemented as in FIG. 2, a first mode of operation of the controller 28 will now be described by reference to FIG. 4 wherein diagrams (A) and (B) show wave forms of the switching pulse signals Q1 and Q2 that are applied to the switches S1 of the two converters. The switching pulse signal Q1 is formed by a sequence of square pulses with constant pulse width and with a period 1/f0 corresponding to the switching frequency of the converters. In the example shown, the duty cycle, i.e. the time when the switch S1 is closed, is slightly smaller than 50%. The switching pulse signal Q2 has the same switching frequency f0 and, consequently, the same period 1/f0, and the pulse width of the pulses is the same as for Q1, but the phase is shifted by 180° (a half period) relative to Q1.

The diagram (C) shows the current I1 flowing through the coil L of the first converter (switched with Q1) as a function of the time t. As described before, the current increases when the switch S1 is closed, and it decreases again when the switch is open. In this example, the duty cycle has been selected such that the current I1 has just decreased to zero when the next cycle begins and the switch is closed again.

Diagram (D) shows the corresponding wave form for the current I2 flowing through the coil L of the second converter 26 (switched with Q2). The wave form has the same shape as for I1, but with a phase delay of 180°.

Figure 4:
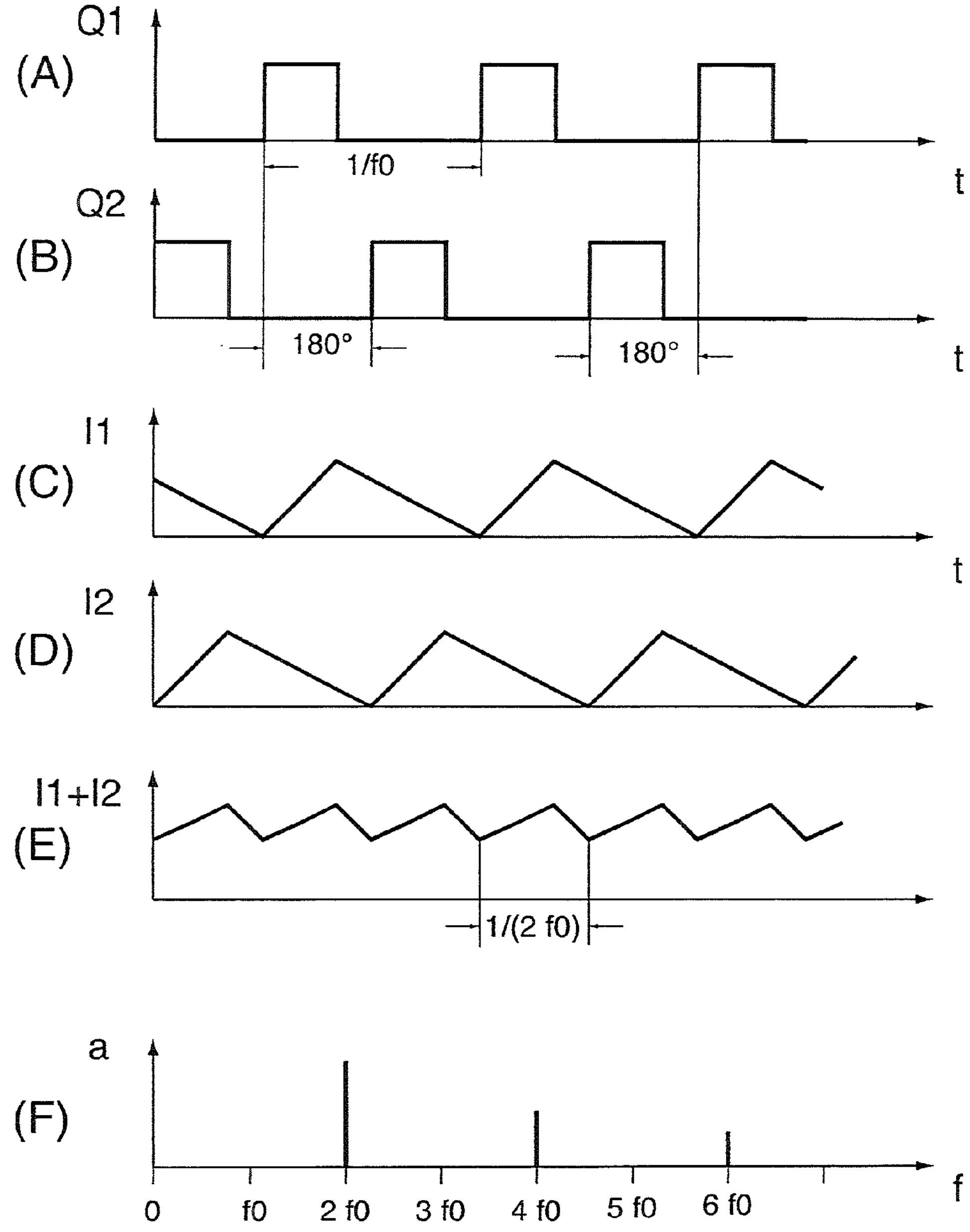
FIG. 4 is a set of diagrams illustrating a balanced mode of operation of two converters of the type shown in FIG. 2.

The diagram (E) in FIG. 4 shows the sum of the currents I1+I2, i.e. the total current drawn from the AC/DC converter 24. The sum of the currents I1 and I2 is always greater than zero and has a saw-tooth shape similar as I1 and I2, but with a frequency twice as high, corresponding to a period 1/(2·f0).

Except for an amplitude scaling and phase delay caused by the transformers T, the output current $I_0$ will have a wave form similar to that in the diagram (E), if the output current is not smoothed by a buffer capacitor. In other words, the output current $I_0$ is not exactly constant but has a certain ripple.

The diagram (F) in FIG. 4 shows a frequency spectrum of the ripple, i.e. the ripple amplitude "a" as a function of the frequency f (the ripple spectrum is similar to the spectrum of the wave form shown in diagram (E)). The frequency components in the spectrum are indicated by bars. As can be seen, in this mode of operation, the frequency spectrum consists of a basic frequency 2·f0 and its higher harmonics 4·f0, 6·f0, etc.

Would the switches S1 of both converters 26 be driven with a common switching pulse signal or, equivalently, with switching pulse signals Q1 and Q2 with a phase shift of 0°, then the wave form for the sum I1+I2 would be similar to the wave form I1 in FIG. 4 (D), and the ripple on the output current $I_0$ would have a much higher amplitude and a lower frequency (f0). Thus, by driving the converters 26 with phase shifted or "interleaved" switching pulse signals, the ripple can be favorably reduced and the frequency spectrum of the ripple can be shifted to higher frequencies. In the extreme, when the duty cycle of the switching pulse signals Q1 and Q2 is 50%, the wave forms for the currents I1 and I2 (diagrams (C) and (D)) would be complementary to one another and their sum would be constant, and the ripple on the output current $I_0$ would be eliminated completely.

This concept can naturally be extended to power supply circuits with three or more converters connected in parallel. In general, when the number of converters is N, the phase shifts of the switching pulse signals Q1, Q2, . . . , QN would be 0, (1/N)×360°, (2/N)×360°, . . . ((N−1)/N×360°). Then, the switching pulse signals would fit into a cyclic pattern in which the phase difference from neighbor to neighbor would always be the same, i.e. 360°/N. With increasing number N, the ripple is increasingly suppressed and shifted to increasingly higher frequencies. The basic frequency (lowest frequency component in the spectrum) would be N·f0).

Considering again the case N=2 and converters 26 implemented as in FIG. 2, another mode of operation will now be described by reference to FIG. 5, where the diagrams (A) and (B) show again the wave forms of the switching pulse signals Q1 and Q2.

Q1 is the same as in FIG. 4, but Q2 has a different phase shift, i. e. 200°. Thus, the distance from the rising flank of one pulse of Q1 to the rising flank of the next pulse of Q2 is 200° (5/9 of a full period). On the other hand, the distance from the rising flank of a pulse in Q2 to the rising flank of the next pulse in Q1 is only 160° (4/9 of a full cycle). Thus, the phase differences are not equal, and this is why this mode of operation is termed "unbalanced".

The diagrams (C) and (D) and (E) show again the related wave forms of the currents I1 and I2 and their sum. However, by comparing the diagrams (E) in FIGS. 4 and 5, it can be seen that the imbalance of the switching pulse signals as the consequence that the period of the sum current has increased from 1/(2·f0) to 1/f0 and, consequently, the lowest frequency has decreased by a factor 2.

Figure 5:
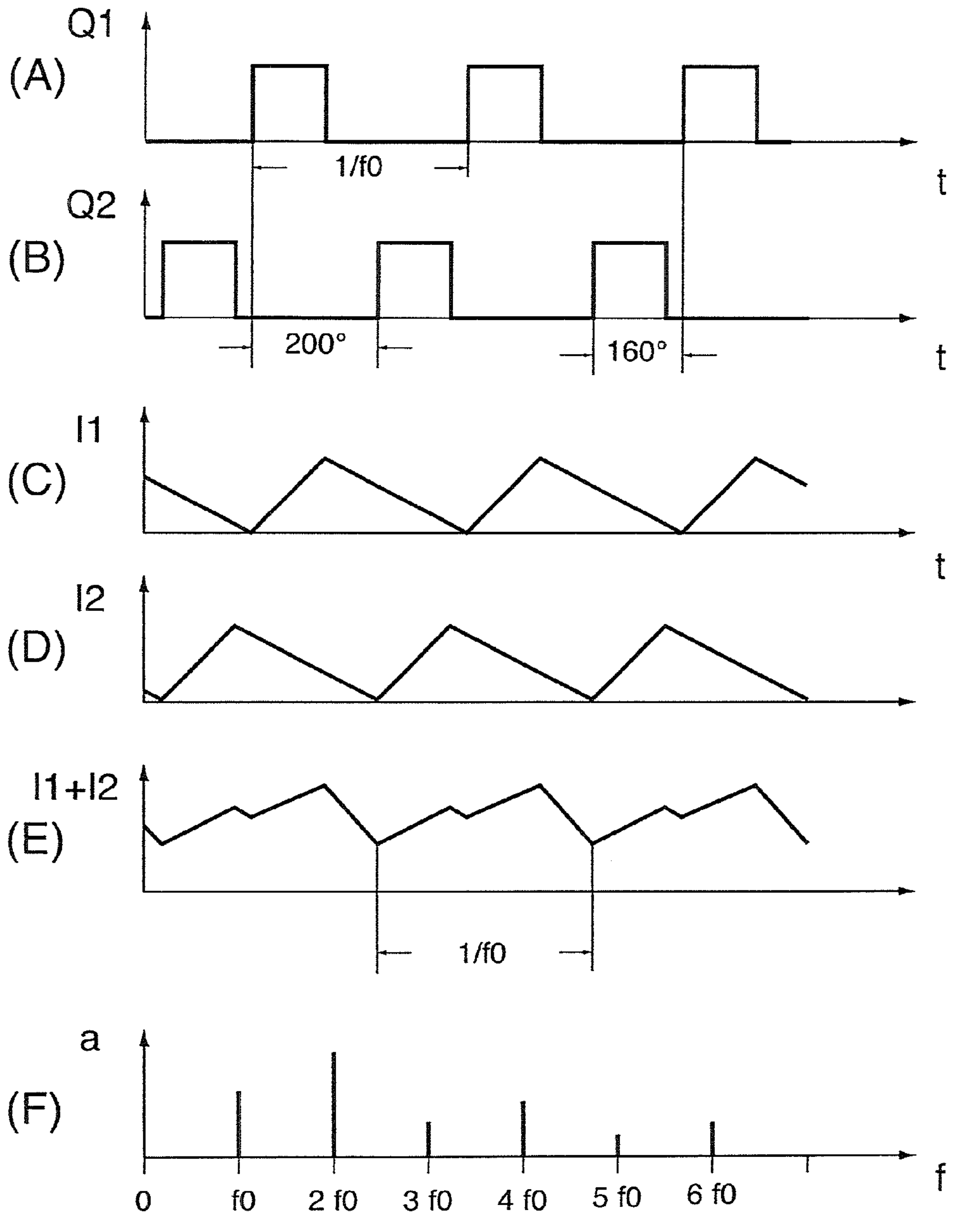
FIG. 5 is a set of diagrams illustrating an unbalanced mode of operation of the converters of the type shown in FIG. 2.

The diagram (F) in FIG. 5 shows the resulting ripple spectrum, with significant bars also at frequencies f0, 3·f0, 5·f0, etc. which were not present in the balanced mode shown in FIG. 4.

According to the invention, this effect is utilized for modulating the output current $I_0$ for the purpose of power line communication. When a bit of a digital message is to be sent by the PLC transmitter 16, the modulation signal M instructs the controller 28 to switch from the balanced mode to the unbalanced mode for a certain time period, e.g. a microsecond or several microseconds. The PLC receivers 18 are tuned to one of the frequencies that are present in the unbalanced mode (FIG. 5) but are suppressed (completely or at least partly) in the balanced mode (FIG. 4). For example, the PLC receivers 18 may be tuned to the switching frequency f0.

Again, this principle can be extended to a larger number N of converters. Then, the unbalanced mode may also be a mode in which the phases of two or more switching pulse signals are offset (relative to the balanced case) by the same amount or different amounts. The number of switching pulse signals having an extra phase shift will influence the amplitudes of the frequency components that occur only in the unbalanced mode. This offers the possibility to control the signal strength and consequently the range of the PLC signal.

By applying different extra phase shifts to several switching pulse signals, it is even possible to excite different frequency components in the ripple spectrum, e.g. a component with the frequency f0 in one mode and a component with the frequency 3·f0 in another mode. Then, when the PLC receivers 18 of the various load circuits 12 are tuned to different frequencies (one to f0 and another one to 3f0, for example), it would be possible to directly address individual PLC receivers 18 without using digital addresses in the transmitted signal.

Figure 6:
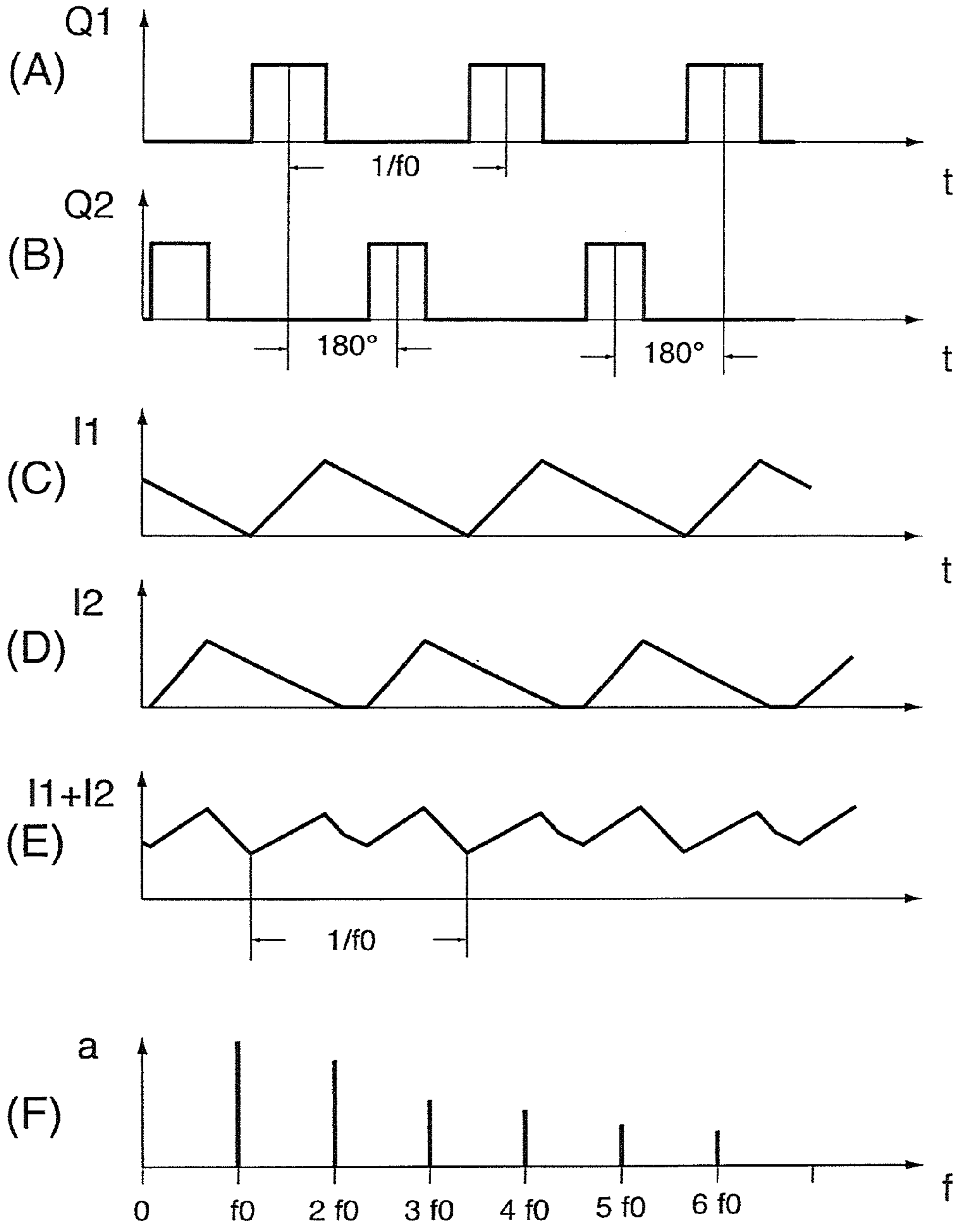
FIG. 6 is a set of diagrams illustrating another example of an unbalanced mode of operation of the converters shown in FIG. 2.

Another example of an unbalanced mode is shown in FIG. 6, where the diagrams (A)-(F) have the same meaning as in FIG. 5. Here, the phase shifts between the switching pulse signals Q1 and Q2 are balanced (180°), but the pulse width of the pulses in D2 is smaller than in Q1. Consequently, as is shown in the diagram (D), the second converter 26 (controlled by Q2) operates in a “discontinuous” mode, where there is a certain gap between the time when the current I2 has decreased to zero and the time when I2 starts to rise again at the beginning of the next period.

As is shown in the diagrams (E) and (F), this also has the consequence that extra frequency components (at f0, 3·f0, etc.) appear, which were suppressed in the balanced mode.

In case of three or more parallel converters, it would of course also be possible to use different unbalanced modes of operation for different converters, e.g. a mode of the type shown in FIG. 5 (phase shift) for one converter and a mode of the type shown in FIG. 6 (pulse shape) for another converter.

Figure 7:
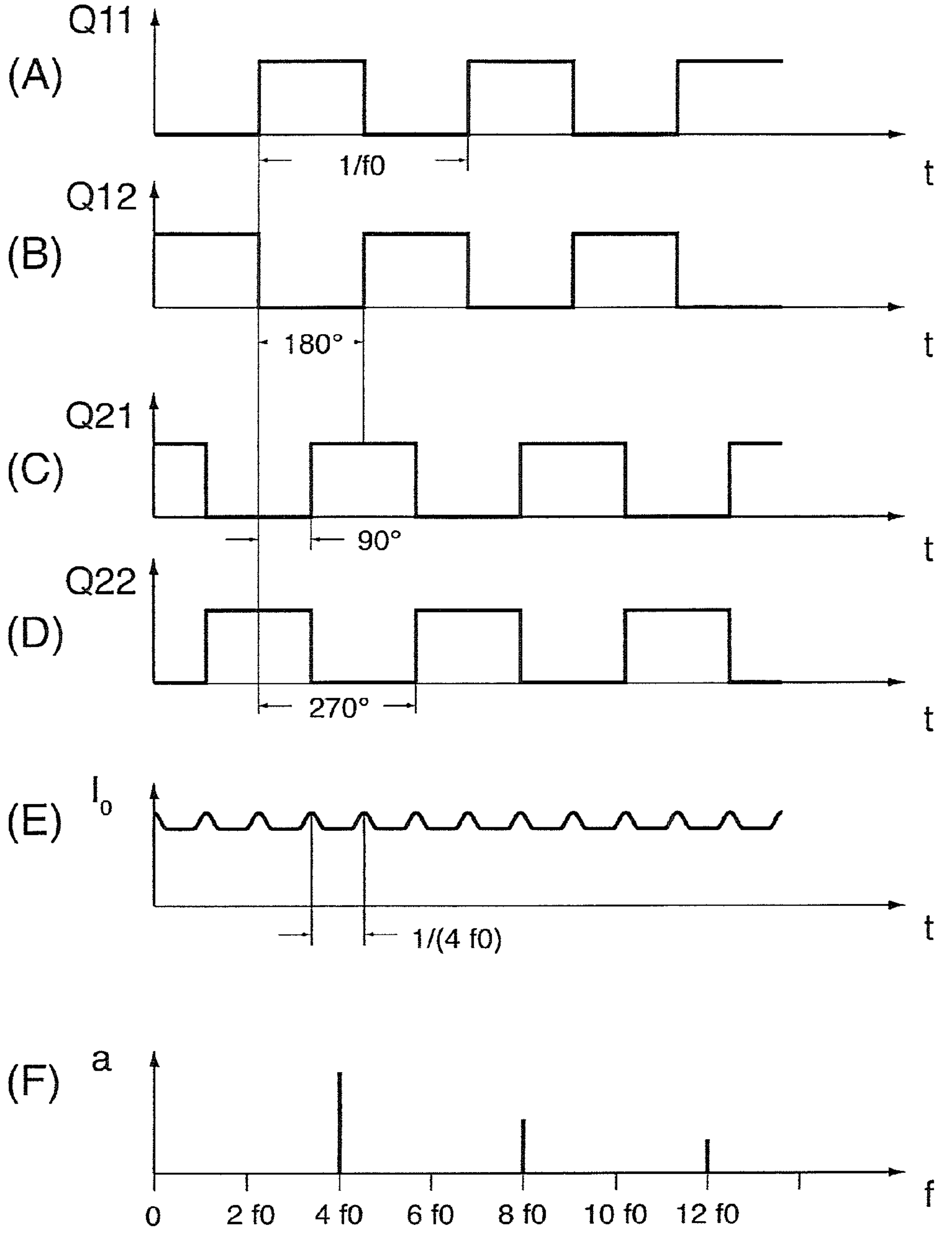
FIG. 7 is a set of diagrams illustrating a balanced mode of operation of two converters of the type shown in FIG. 3.

FIG. 7 illustrates a balanced mode of operation for the case that the (two) converters (26) are implemented as in FIG. 3.

In FIG. 7, the diagrams (A) and (B) show the wave forms of the switching pulse signals Q11 and Q12 for the switches S1 and S2 of the first converter, and the diagrams (C) and (D) show the wave forms of switching pulse signals Q21 and Q22 for the switches S1 and S2 of the second converter.

In this case, as was explained before, the wave forms of Q11 and Q12 are complementary to one another, corresponding to a phase shift of 180° and a duty cycle of 50% (minus a little safety margin for avoiding short circuits), and the same applies to the switching pulse signals Q21 and Q22. In the balanced mode, the phase shift between Q11 and Q12 on the one hand and Q21 and Q22 on the other hand is 90°. When ordering the switching pulse signals in a cyclic pattern Q11, Q21, Q12, Q22, Q11, . . . the phase shifts will be 0, 90°, 180°, 270°, 0, . . . , i.e. the phase difference from neighbor to neighbor is always 90°.

In this implementation, the sum of the currents drawn from the first stage AC/DC converter 24 is always constant. Nevertheless, the switching operations will create a certain ripple on the output current $I_0$, as has been shown exaggeratedly in the diagram (E) in FIG. 7. Each switching operation of at least one of the switches S1 and S2 of any converter will cause a little disturbance of the output current $I_0$. Consequently, in the balanced mode, the period of the ripple is 1/(4·f0), and the ripple spectrum consists of the basic frequency component 4·f0 and its higher harmonics, as is shown in the diagram (F).

Figure 8:
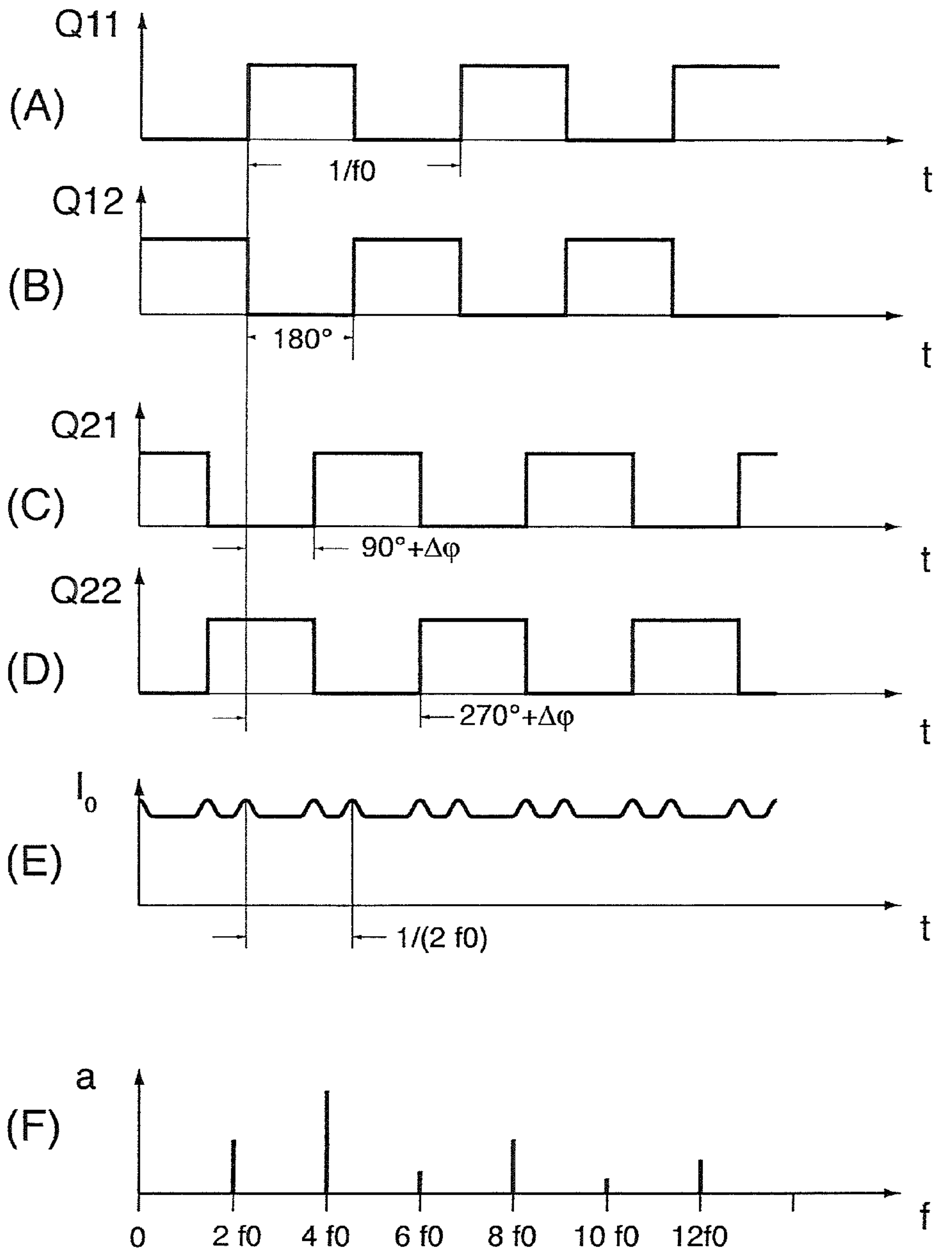
FIG. 8 is a set of diagrams illustrating an unbalanced mode of operation of the two converters of the type shown in FIG. 3.

FIG. 8 illustrates an unbalanced mode of operation for this converter implementation. The diagrams (A)-(F) have the same meaning as in FIG. 7. In this example, the unbalance is caused by a little extra phase offset ($\Delta\phi$) in the switching pulse signals Q21 and Q22 for the second converter. As can be seen in the diagram (E), this doubles the period of the ripple and gives rise to additional frequency components in the spectrum (diagram (F)). In this case, the additional frequency components that occur only in the unbalanced mode have the frequencies 2·f0, 6·f0, 10·f0, etc.

What is claimed is:

1. A power line communication (PLC) system comprising:

a power supply circuit including:

a number N, N≥2, of cyclically switched electronic converters connected in parallel and having respective outputs connected to a common output terminal of the power supply circuit; and a controller providing switching pulse signals for switching the converters with a switching frequency that is the same for all converters;

at least one load circuit connected to the output terminal of the power supply circuit;

a PLC transmitter arranged to modulate an output current from the output terminal of the power supply circuit; and a PLC receiver in said at least one load circuit, wherein the controller is arranged to switch the converters with interleaved switching pulse signals;

wherein the PLC transmitter is arranged to modulate the output current by switching the controller between at least two modes of operation that differ from one another in at least one of phase relations and pulse shapes of the switching pulse signals, thereby changing a ripple frequency spectrum of the output current in such a way that a suppression amount of a predetermined frequency component in the ripple frequency spectrum is changed depending upon the mode of operation; and wherein the PLC receiver is arranged to detect said predetermined frequency component.

2. The PLC system according to claim 1, wherein said predetermined frequency component has a frequency that is different from N times the switching frequency and higher harmonics thereof.

3. The PLC system according to claim 2, wherein said predetermined frequency component is the switching frequency.

4. The PLC system according to claim 1, wherein said PLC receiver is adapted to self-tuning to the predetermined frequency component.

5. The PLC system according to claim 1, wherein the power supply circuit includes an AC/DC converter as a first stage, and said converters that are connected in parallel are DC/DC converters.

* * * * *